(12) United States Patent  
Staudenmaier et al.

(10) Patent No.: US 9,232,156 B1
(45) Date of Patent: Jan. 5, 2016

(54) VIDEO PROCESSING DEVICE AND METHOD

(71) Applicants: Michael Andreas Staudenmaier, Munich (DE); Stephan Herrmann, Markt Schwaben (DE); Robert Cristian Krutsch, Munich (DE)

(72) Inventors: Michael Andreas Staudenmaier, Munich (DE); Stephan Herrmann, Markt Schwaben (DE); Robert Cristian Krutsch, Munich (DE)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 14/492,573

(22) Filed: Sep. 22, 2014

(51) Int. Cl.
*H04N 9/74* (2006.01)
*H04N 5/265* (2006.01)

(52) U.S. Cl.
CPC ..................... *H04N 5/265* (2013.01)

(58) Field of Classification Search
CPC ....... H04N 5/265; H04N 5/262; H04N 5/268; H04N 7/181; G09G 2340/10; G09G 2340/12
USPC .......... 348/584, 588, 597–599; 345/629, 630, 345/634, 635
IPC ............................................. H04N 9/74, 9/76
See application file for complete search history.

(56) References Cited

U.S. PATENT DOCUMENTS

| | | | |
|---|---|---|---|
| 5,774,132 A | 6/1998 | Uchiyama | |
| 5,999,183 A | 12/1999 | Kilgariff et al. | |
| 6,288,730 B1 | 9/2001 | Duluk, Jr. et al. | |
| 6,707,458 B1 | 3/2004 | Leather et al. | |
| 6,798,421 B2 | 9/2004 | Baldwin | |
| 7,710,424 B1 | 5/2010 | Hutchins et al. | |
| 2005/0179702 A1* | 8/2005 | Tomlinson | G09G 5/363 345/629 |
| 2011/0254852 A1 | 10/2011 | Howson | |

FOREIGN PATENT DOCUMENTS

GB 2336086 A 10/1999

* cited by examiner

*Primary Examiner* — Sherrie Hsia

(57) ABSTRACT

A video processing device for generating an output video stream on the basis of two or more concurrent input video streams and a method thereof are described. Each input video stream comprises a sequence of input images. The output video stream comprises a sequence of output images. The video processing device generates each output image by merging a respective set of input images. The set of input images comprises one input image from each input video stream. The video processing device merges the input images in a series of merging rounds. Each merging round comprises forming an output tile by merging a set of input tiles, and writing the output tile to an output memory unit. The set of input tiles comprises one input tile from each input image of the respective set of input images. The output tiles written to the output memory unit represent the output image.

11 Claims, 6 Drawing Sheets

VIDEO PROCESSING DEVICE AND METHOD

FIELD OF THE INVENTION

This invention relates to a video processing device and method.

BACKGROUND OF THE INVENTION

A video stream is a data stream, which represents a succession of video frames. A video frame is a still image, for example, a digital photograph produced by a digital camera. A video stream may be fed to a video player to display the video frames successively on a screen where it may be viewed by a viewer.

In some applications, a video stream is generated on the basis of several, that is two or more, input video streams. The input video streams may originate from separate video sources. In one example, a set of two or more video cameras are arranged to operate in parallel, each video camera generating a video stream. The video cameras may be oriented into different viewing directions so as to capture different views. A graphics processing unit may be arranged to merge the videos streams frame by frame to generate an output video stream. Each frame of the output video stream, that is, each output frame, may thus comprise video content from more than one camera.

FIG. 1 schematically shows an example of a video processing device. The video processing device 10 may for example comprise a set of video sources 12, a memory unit 14, and a processing unit 16. The processing unit 16 may also be referred to as a graphics processing unit (GPU) or a video processing unit. The set of video sources 12 may comprise two or more video sources. In the example, the set of video sources 12 comprises six video sources 12A to 12F. Each video source may for example be a video camera. The video sources 12 may be connected to the processing unit 16 via the memory unit 14. The memory unit 14 may thus act as a buffer for buffering the video streams from the video sources 12. The memory unit 14 may further be arranged to provide additional data to the processing unit 16. Such additional data may, for example, comprise geometry data. For example, each of the input video streams may have tile definitions associated with it which are the same for each image of the respective input video stream and which define the shape and position of each tile of the respective image. Furthermore, the memory unit 14 may be arranged to provide a Z buffer and a frame buffer. The memory unit 14 may be a double data rate (DDR) memory unit. The term DDR relates to transactions (e.g., read, write, or clear operations), which may be performed both on rising edges and on falling edges of a clock signal. In the example, the video sources 12 and the processing unit 16 are connected to the memory 14 via a data bus 18 (BUS). In another example (not shown), there may be a more direct connection between these units.

In operation, each of the video sources 12A to 12F may generate a respective video stream. The video streams may be fed to the processing unit 16 via the memory unit 14. The processing unit 16 may generate an output video stream on the basis of the input video streams, that is on the basis of the video streams from the video sources 12. For example, each of the video sources 12 may provide a real-time image of a certain field of view. These views may be partly overlapping and the processing unit 16 may stitch them together to form a combined real-time image, e.g., a panoramic view, a surround view, or a bird's eye view of a scene covered by the video sources 12. The video sources 12 may for example be cameras installed on a vehicle for providing a driver of the vehicle with video on a screen showing the vehicle and its current surroundings.

In one example, the memory unit 14 is arranged to store a complete frame for each of the video sources 12A to 12F, thereby enabling the processing unit 16 to generate an output frame on the basis of these input frames. At the same time, in addition to providing the set of complete frames (one complete frame per video source), the memory unit 14 may collect video data from the video sources 12 for the next frame. Furthermore, the memory unit 14 may provide memory space for the output images from the processing unit 16. The processing unit 16 may thus write the output images to the memory unit 14 where they may be accessed by another unit (not shown), e.g., by a video display device. When there are N video sources (e.g., N=6), the memory unit 14 may thus need to provide memory space for a total of P times N images from the video sources 12, wherein P is at least two.

SUMMARY OF THE INVENTION

The invention provides a video processing device and method as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Identical reference symbols refer to identical, similar, or analogous components.

DETAILED DESCRIPTION

Figure 2:
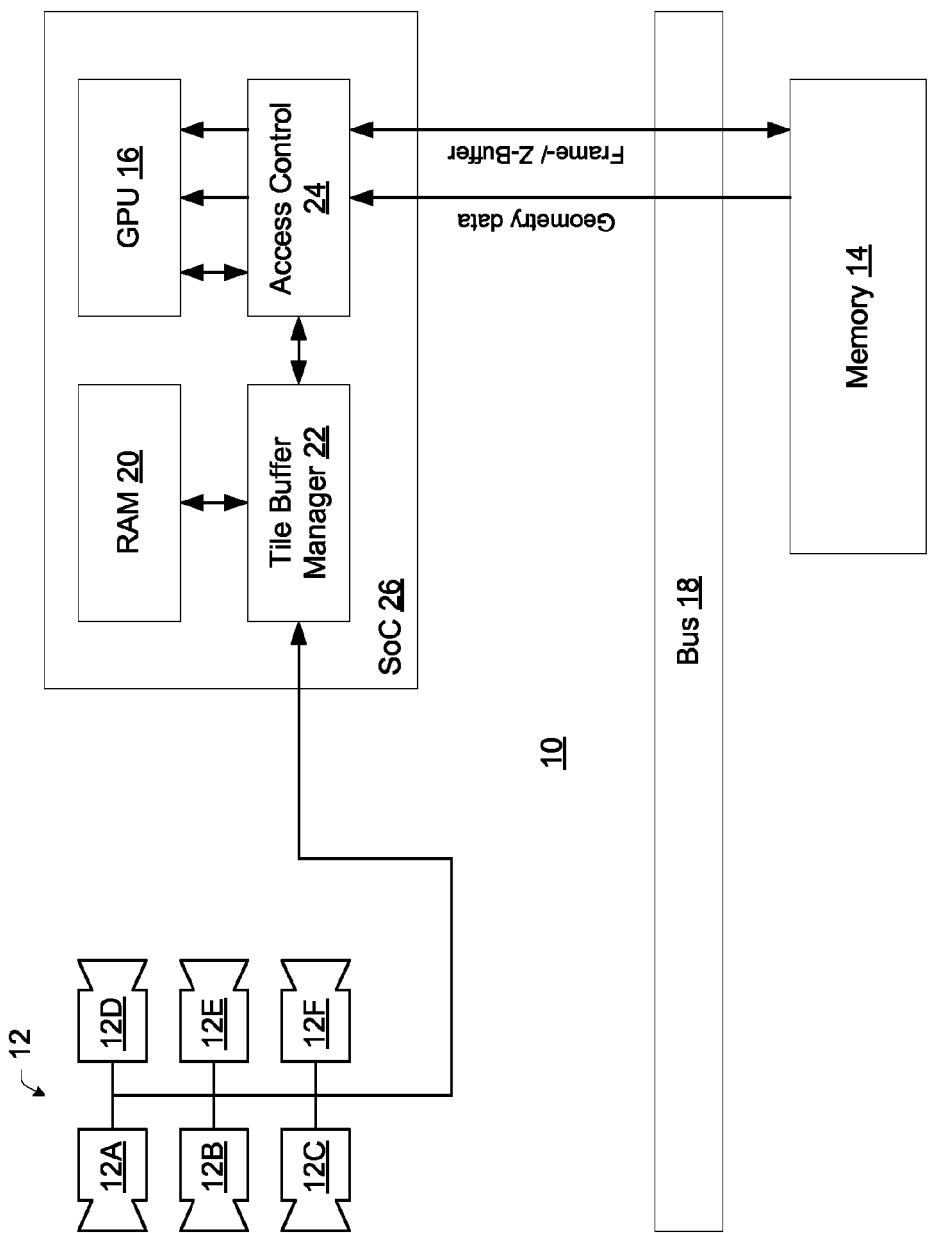
FIG. 2 schematically shows a simplified block diagram of a video processing device according to an example of the present application.

FIG. 2 schematically shows another example of a video processing device 10. In this example, the video processing device 10 is arranged to route video data from the video sources 12 to the processing unit 16 via a dedicated memory unit 20, e.g., a random access memory unit. The memory unit 20 may have a relatively small capacity. This may be achieved by an adapted scheme of writing video data from the video data sources 12 to the memory unit 20. Namely, it is realized that the processing unit 16, in order to determine a certain pixel (output pixel) of the output image, does not require access to the entire image from each of the video sources 12. In this context, it may be convenient to introduce the notion of tiles. A tile is a sub-region of an image, e.g., a coherent sub-region. A tile may for example be a line, a band, a column, or any other sub-region of an image. In order compute a certain tile of the output image, the processing unit 16 does not need to know every pixel of the input images provided by the video sources 12. Rather, the output image may be divided into tiles (output tiles), wherein each output tile has associated with it a certain set of input tiles, the set of input tiles comprising one tile per video source. The set of input tiles may be buffered in the memory unit 20 to enable the processing unit 16 to compute the corresponding output tile. The dedicated memory unit 20 may be referred to as the tile buffer 20.

Figure 1:
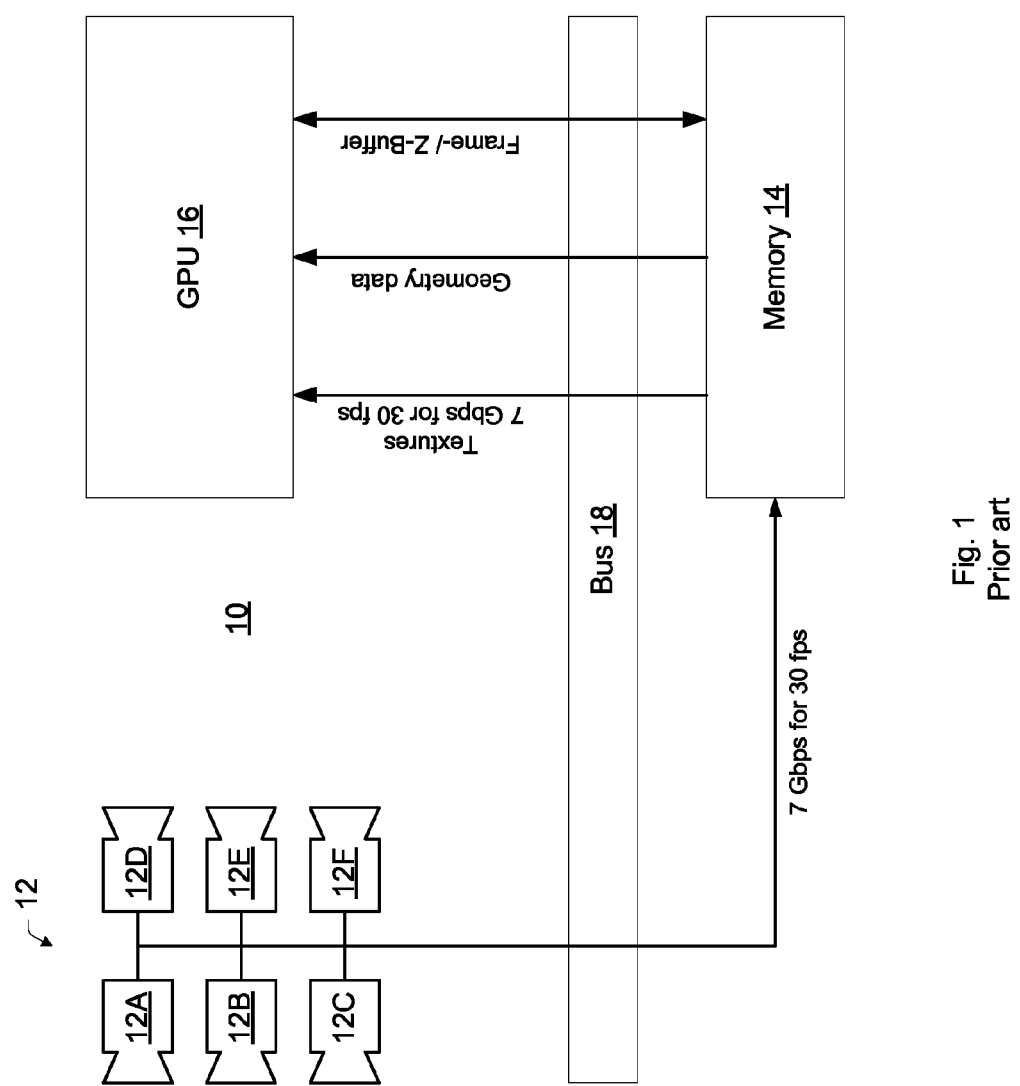
FIG. 1 schematically shows a simplified block diagram of an example of a video processing device.

In the example, the video processing device comprises a tile buffer manager 22 and an access control unit 24. The tile buffer manager 22 may be arranged as an interface between the tile buffer 20 and the access control unit 24. The access control unit 24 may be arranged as an interface between the processing unit 16, on the one hand, and the tile buffer manager 22 and the memory unit 14, on the other hand. The processing unit 16, the access control unit 24, the tile buffer 20 and the tile buffer manager 22 may be arranged as components of a system on chip (SoC) 26. Considering that memory in a system on chip tends to be expensive, the reduced size of the tile buffer 20 as compared to the size that would be necessary for storing entire images may be particularly beneficial. Furthermore, the video sources 12 may be connected to the system on chip 26 by a dedicated video data line or a dedicated video data bus rather than via the bus 18 interconnecting components of the video processing device. The memory unit 14 may thus be smaller compared to the example in FIG. 1. Furthermore, power consumption may be reduced.

Figure 3:
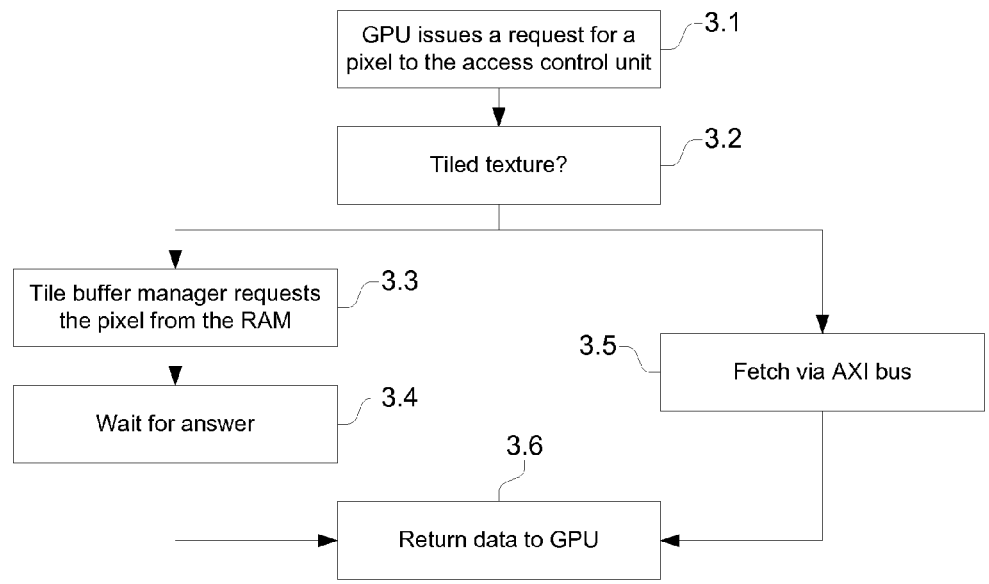
FIG. 3 schematically shows a flow chart of an example of a method of operating a video processing device.

The flow chart in FIG. 3 illustrates an example of a method of operating an example of a video processing device, e.g., the video processing device 10 of FIG. 2. The method may start with the processing unit 16 issuing a request to the access control unit 24 for retrieving data describing a certain pixel of one of the input images from the video sources 12 (box 3.1). The access control unit 24 may then determine whether the output image is arranged as a tiled image (box 3.2). In this case, the tile buffer manager 22 may request the respective pixel data from the tile buffer 20 (box 3.3). The access control unit 24 may then have to wait for a certain while, e.g., one or more clock cycles, for an answer from the tile buffer manager 22 (box 3.4). This may happen, for example, when a certain pixel from one of the video sources has not yet arrived. In the meantime, the processing unit 16 may stall. The processing unit 16 may thus be controlled by the flow of data from the video sources. It may thus be ensured that all video data from the video sources will actually be taken into account for generating the output video stream, even when part of that video data is late for one reason or another. A continuous output video stream may thus be generated. The access control unit 24 may then provide the pixel data obtained from the tile buffer 20 via the tile buffer manager 22 to the processing unit 16. If, however, the access control unit 24 determines (in box 3.2) that the output image is not arranged as a tiled image, the respective pixel data may, for example, be fetched via the bus 18 from, e.g., the memory unit 14. It is pointed out that the variant in which the pixel data is fetched via the bus 18 (box 3.5) may be absent in an implementation in which the processing unit 16 is arranged to generate every output image on the basis of a set of tiled images. Referring back to FIG. 3, when the access control unit 24 has fetched the pixel data via the bus 18, it may provide the pixel data to the processing unit 16 (box 3.6).

Preferably, the processing unit 16 has an operating frequency, which is higher than would be necessary for processing the video streams from the video sources at a uniform processing rate. The processing unit may thus be able to make up for the time lost while it stalled. In other words, any stall by the processing unit 16 may at least partly be compensated by periods, in which the processing unit 16 processes data from the video sources at a rate that is higher than the rate of incoming data. This may allow the tile buffer 20 to be relatively small.

Figure 4:
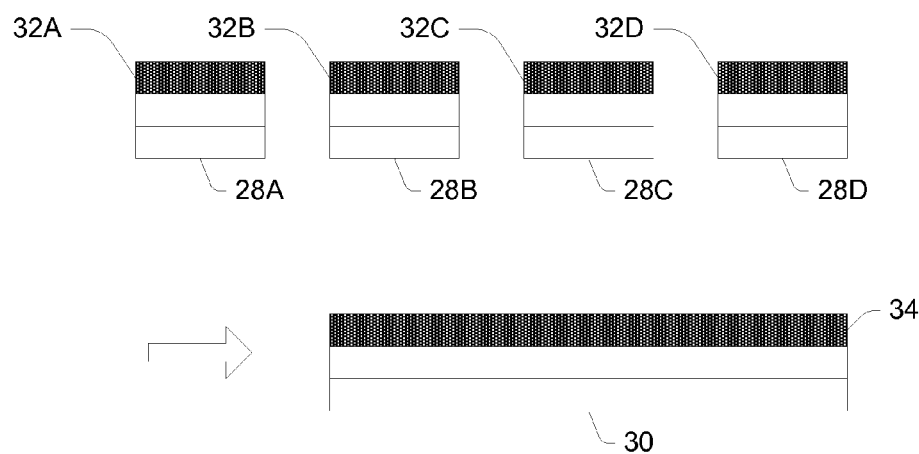
FIG. 4 schematically shows a diagrammatic illustration of a first round of a tile merging operation according to an example of the present application.
Figure 5:
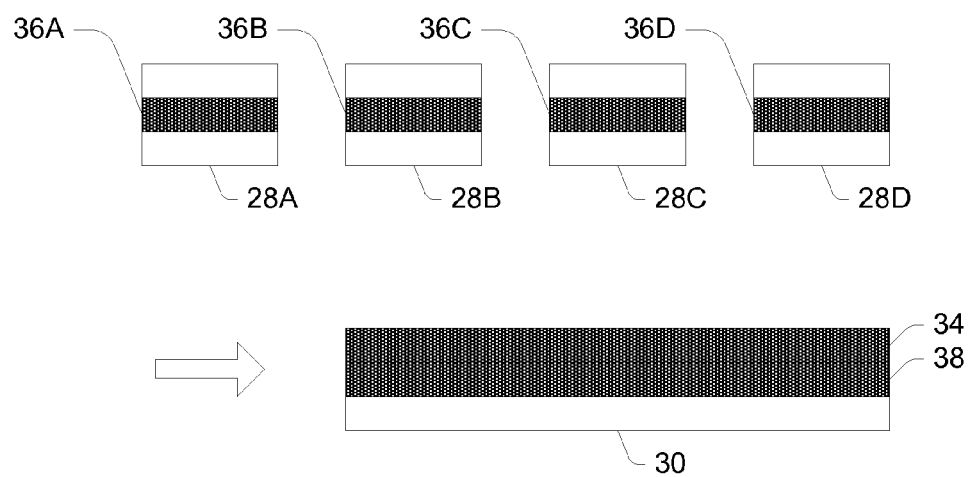
FIG. 5 schematically shows a diagrammatic illustration of a second round of a tile merging operation according to an example of the present application.
Figure 6:
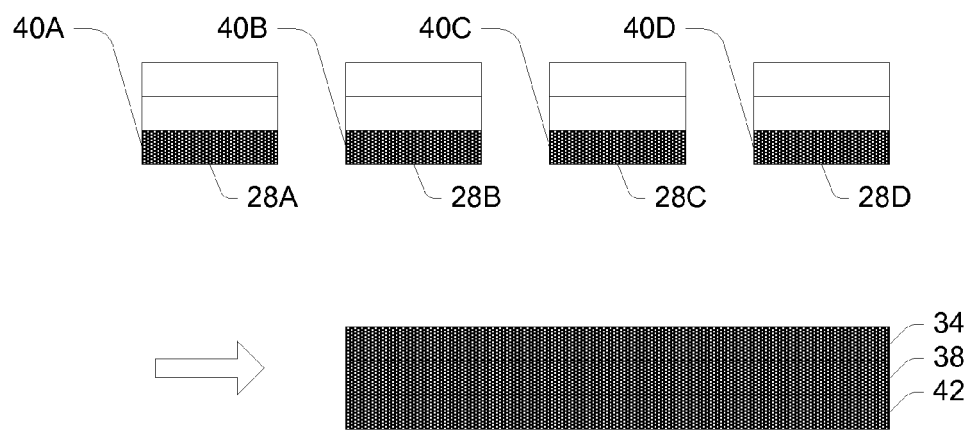
FIG. 6 schematically shows a diagrammatic illustration of a third round of a tile merging operation according to an example of the present application.

An example of an operating mode of the video processing device 10 is described by making additional reference to FIGS. 4, 5 and 6. The video processing device 10 may be operated to generate an output video stream on the basis of two or more concurrent input video streams. Each of the input video streams may comprise a sequence of input images. The output video stream may comprise a sequence of output images. The video processing device 10 may be arranged to generate each of the output images by merging a respective set of input images. For example, in FIGS. 4 to 6, an output image 30 is generated by merging input images 28A to 28D. The input images 28A to 28D may originate, for example, from the video sources 12A to 12D, respectively.

The video processing device 10 may be arranged to merge the set of input images, e.g., the input images 28A to 28D, in a series of two or more merging rounds. In the shown example, the input images 28A to 28D are merged to form the output image 30 in three rounds. FIG. 4 illustrates the first round. FIG. 5 illustrates the second round. FIG. 6 illustrates the third round. Each merging round may comprise forming an output tile by merging a set of input tiles, and writing the output tile to an output memory unit, e.g., to the memory unit 14. The set of input tiles may comprise one input tile from each input image of the respective set of input images. The output tiles written to the output memory unit in the series of merging rounds may constitute the output image. For example, in the first round shown in FIG. 4, each of the input images 28A to 28D from the respective input video streams comprises a respective tile 32A, 32B, 32C and 32D, respectively. As mentioned above, a tile is a sub-region of an image. The tiles 32A to 32D may be merged to form a first tile 34 of the output image 30. In the second round, illustrated in FIG. 5, tiles 36A to 36D of the images 28A to 28D may be merged to form a second tile 38 of the output image 30. Similarly, tiles 40A to 40D of the input images 28A to 28D may be merged to form a third tile 42 of the output image 30 (see FIG. 6). The thus produced output tiles 34, 38, and 42 may together form the output image 30. In other implementations, there may be less (e.g. two) or more than three rounds. In general terms, it may be possible to decompose the output image 30 into N tiles such that each of the N tiles can be built separately from a corresponding set of input tiles.

The input images from the various video sources 12 may be partly overlapping in the sense that they represent partly overlapping fields of views. Merging them may therefore involve fairly complicated computations. Furthermore, each input image may represent a curved surface. Merging the input images may therefore require taking curvature effects into account. In one example, the output image 30 may be thought of as the inner surface of a sphere. The input images 28A to 28D may then be thought of as regions, which may be partly overlapping, on this inner surface.

Each merging round may involve buffering the input tiles, e.g., the input tiles 28A to 28D, in a tile buffer, e.g., in the tile buffer 20 shown in FIG. 2. The proposed method of constructing the output image in a series of rounds using tiles of the input images may be particularly beneficial in that it does not require buffering the entire input images. Indeed, when tiles of the output image, e.g., tiles 34, 38, and 42, are computed successively, it may be sufficient to buffer for any merging round only the input tiles to be merged in the given merging round. For example, in the first round as illustrated in FIG. 4, only the input tiles 32A to 32D may have to be buffered. The input tiles 36A to 36D of the second round and the input tiles 40A to 40D of the third round may be not required for the first round. Similarly, the input tiles 32A to 32D of the first round (see FIG. 4) may be not required for the second round or the third round. Accordingly, buffer space allocated to the input tiles 32A to 32D of the first round may be freed upon terminating the first round. The buffer space that is thus made available can be used, for example, for buffering the input tiles of the second round (see FIG. 5). Generating the output image 30 on the basis of tiles rather than on the basis of complete input images may thus result in an important saving of buffer space.

Figure 7:
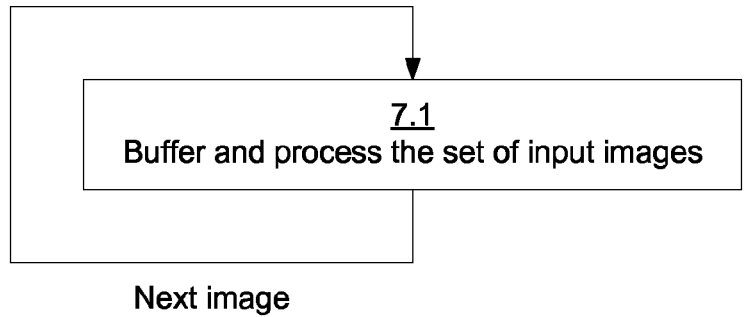
FIG. 7 schematically shows a flow chart of an example of a method of generating an output image.
Figure 8:
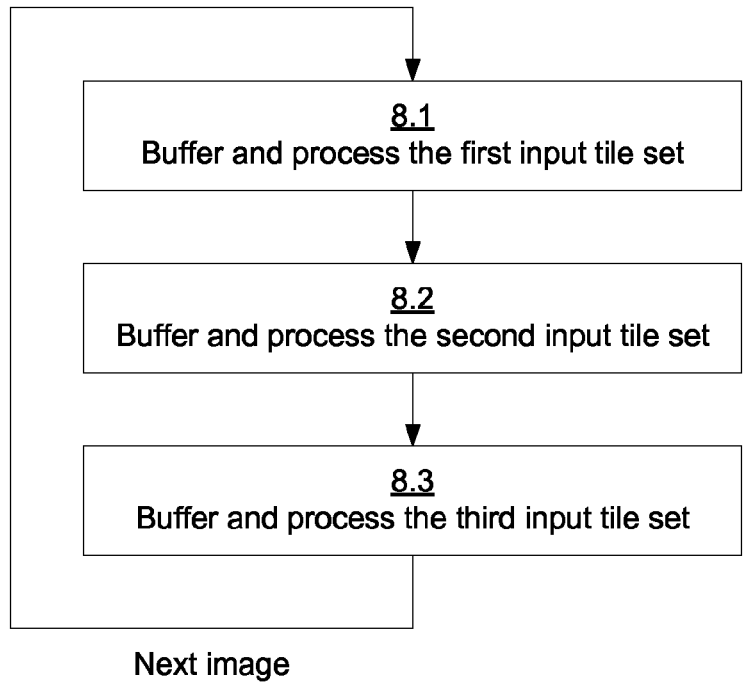
FIG. 8 schematically shows a flow chart of a method of generating an output image according to an example of the present application.

This aspect is further illustrated in reference to FIGS. 7 and 8. FIG. 7 refers to a previous processing scheme as may be implemented, for instance, in the video processing device 10 shown in FIG. 1. To generate a frame of the output video stream, e.g. to generate an output image, the required set of input images, e.g., input images 28A to 28D, may be buffered. The entire input images, e.g., 28A to 28D, may thus be made available to the processing unit and the processing unit may thus merge them to generate an output image. Depending on the number and size of the input images, the buffer space required for buffering simultaneously the complete set of input images for the respective output image may be substantial. When the output image has been computed (in box 7.1), the next image may be computed. The process flow may thus return to the start of box 7.1.

The flow chart in FIG. 8 illustrates an example for a tile-based approach, e.g., a scheme in which an output image of the output video stream is computed in three successive round (boxes 8.1, 8.2, and 8.3). In the first round 8.1, a first tile set, e.g., 32A to 32D (see FIG. 4) may be buffered and processed to generate a first output tile, e.g., the output tile 34. The buffer space for the first tile set or at least part thereof may then be deallocated or freed. In the second round 8.2, a second tile set, e.g., 36A to 36D (see FIG. 5) may be buffered and processed to generate a second output tile, e.g., the output tile 38. The buffer space for the second tile set or at least part thereof may then be deallocated. Similarly, a third tile set, e.g., the tiles 40A to 40D (see FIG. 6) may then be buffered and processed to generate a third output tile, e.g., the output tile 42. The buffer space for the third tile set or at least part thereof may then be deallocated and the rounds may be repeated for the next image, e.g., the next frame of the output video stream.

Although the input tiles 32A to 32D, 36A to 36D, and 40A to 40D are shown as horizontal bands in FIGS. 4 to 6, a tile may in general have any shape and size. The same is true for any output tile. Also, the shapes, sizes, or positions of input tiles may be different for each input video stream. For example, a tile may be band-shaped or circular. Band-shaped tiles may extend in any direction with respect to the image space. For example, a band-shaped tile may be horizontal, vertical or diagonal when the respective input image is rectangular. Also, it may be possible to construct the output image in more than three rounds, which would allow for an even greater saving buffer space.

In one implementation, the last N lines of each video source may be kept in the tile buffer 20. In other words, the tile buffer 20 may be a first-in first-out (FIFO) buffer. Each input tile from each video source may thus drift through the tile buffer 20. Depending on the size of tile buffer 20, each input tile may be available completely in the tile buffer 20 during one or more clock cycles. However, this is not necessarily so, and in another example, an initial part of a tile may leave the tile buffer 20 before an end part of the tile has entered the buffer.

More generally, the time buffer 20 receives concurrent input video streams each from one of the video sources. Each input video stream is formed on a sequence of pixels, which are transmitted continuously from the respective video source to the buffer 20. A predefined number of pixels represents an image of the sequence of input images comprised by an input video stream.

The buffer 20 has a limited storage capacity and stores a sliding window of the continuously transmitted pixels of each video stream. Input video streams generated by the video sources provide the pixels of a video stream at the buffer 20 at a predefined rate.

The storage capacity of the buffer 20 is adapted such that the size of the sliding window of the each video stream comprises the respective input tile to be processed. The storage capacity of the buffer 20 may be determined as a function of the number of input streams, the tile size and the processing speed of the video processing device. In the buffer 20 storing a sliding window of each video input stream, the respective oldest pixel of an input video stream is overwritten continuously with the most recent pixel received via the input video stream.

Figure 9:
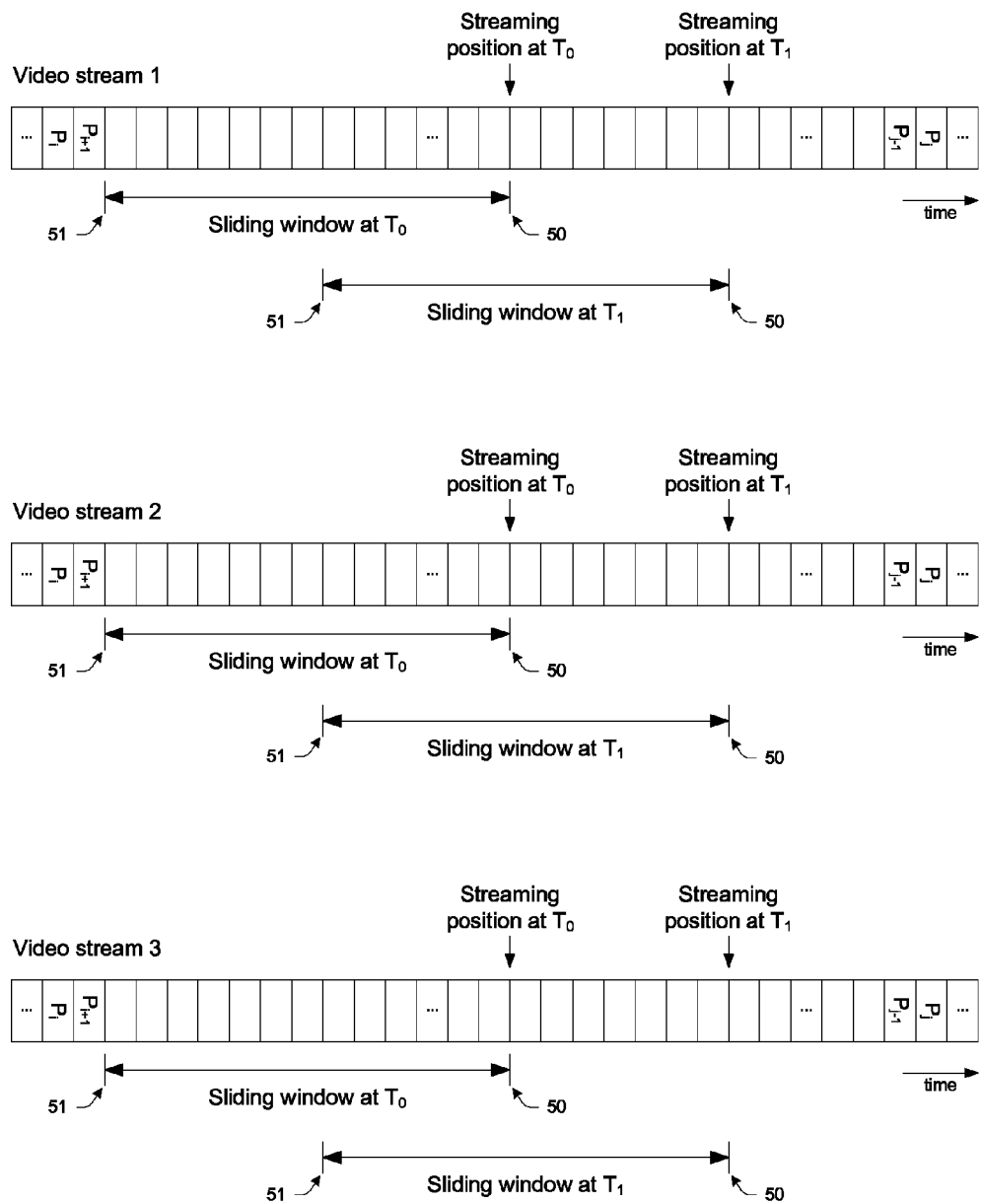
FIG. 9 schematically shows a diagrammatic illustration of the video streams and the sliding window buffering according to an example of the present application.

Referring now to FIG. 9, three exemplary video streams are schematically illustrated, which are composed of segments or portions continuously transferred via the stream from the video source to the buffer 20. Each segment or portion may be a pixel P, or a predetermined number of pixels. The buffer head 50 and buffer trail 51 indicate the most recent and least recent segment received via the respective stream. For the sake of illustration, a sliding window having a predefined size is shown at two different points in time $T_0$ and $T_1$, wherein $T_1$ is after $T_0$. The size of the sliding window is configured to comprise the tile to be processed. In particular, the size of the sliding window is configured to comprise the respective portion of a current tile to be retrieved for being processed by the processing unit 16 of the video processing device 10. Once, the respective portion has been retrieved from being processed by the processing unit 16, the memory location of the buffer at which this portion is stored may be overwritten with a portion newly received via the stream. The buffer 20 provide storage capacity for the sliding window of each input video stream received by the video processing device and processed thereat to form a merged output video stream.

Thus, a method of generating an output video stream on the basis of two or more concurrent input video streams is proposed. Each of the input video streams comprises a sequence of input images. The output video stream comprises a sequence of output images. The method comprises, for each of said output images: generating the output image by merging a set of input images, wherein the set of input images comprises one input image from each of said input video streams and wherein said operation of merging the set of input images comprises a series of two or more merging rounds, wherein each round comprises: forming an output tile by merging a set of input tiles, wherein the set of input tiles comprises one input tile from each input image of said set of input images, wherein merging the set of input tiles comprises: providing input tile data in a tile buffer, the input tile data representing the set of input tiles; and operating a processing unit to retrieve input tile data from the tile buffer required for computing at least a part of the output tile and to compute the output tile on the basis of the retrieved input tile data. The input tile data from the tile buffer required for computing at least a part of the output tile may comprise at least a part of the input tile data provided in the buffer. Operating the processing unit may comprise: stopping computing the output tile in response to detecting that required input tile data is not present in the tile buffer and resuming computing the output tile in response to retrieving the required input tile data from the tile buffer. The buffer may be successively filled with data received via the input video streams and may store a sliding window of the data of each input video stream at each point in time in accordance with the streaming rate.

The invention may also be implemented in a computer program for running on a computer system, at least including code portions for performing operations of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connections that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, the tile buffer 20 may be integrated in the memory unit 14.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments. For example, the merging rounds 8.1, 8.2, 8.3 may be carried out in any order.

Also for example, in one embodiment, the illustrated examples may be implemented as circuitry located on a single integrated circuit or within a same device. For example, the units 16, 20, 22, and 24 may be located on a single integrated circuit, e.g., the system on chip 26. Alternatively, the examples may be implemented as any number of separate integrated circuits or separate devices interconnected with each other in a suitable manner. For example, the tile buffer 20 and the processing unit 16 may be located on separate integrated circuits.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as "computer systems".

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word "comprising" does not exclude the presence of other elements or operations then those listed in a claim. Furthermore, the terms "a" or "an", as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an". The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A video processing device for generating an output video stream on the basis of two or more concurrent input video streams, wherein each of the input video streams comprises a sequence of input images, the output video stream comprises a sequence of output images, and the video processing device is arranged to generate each of said output images by merging a respective set of input images, wherein the set of input images comprises one input image from each of said input video streams and wherein the video processing device is arranged to merge the set of input images in a series of two or more merging rounds, wherein each merging round comprises:

forming an output tile by merging a set of input tiles, wherein the set of input tiles comprises one input tile from each input image of the respective set of input images, and writing the output tile to an output memory unit, wherein the output tiles written to the output memory unit in said series of merging rounds represent the output image;

wherein the video processing device comprises a tile buffer and a processing unit and is arranged to merge the set of input tiles by:

providing at least a part of input tile data in the tile buffer, the input tile data representing the set of input tiles; and operating the processing unit to retrieve input tile data from the tile buffer required for computing at least a part of the output tile and to compute the output tile on the basis of the retrieved input tile data;

and wherein the processing unit is arranged to stop computing the output tile in response to detecting that required input tile data is not present in the tile buffer and to resume computing the output tile in response to retrieving the required input tile data from the tile buffer.

2. The video processing device of claim 1, wherein the processing unit has an processing capacity, which is sufficiently high to enable the processing unit to make up for periods during which it waits for the required input tile data to arrive in the tile buffer.

3. The video processing device of claim 1, wherein the input tile data represents only the set of input tiles or a portion thereof, and not the set of input images.

4. The video processing device of claim 1, comprising a random access memory unit, which comprises the tile buffer.

5. The video processing device of claim 1, wherein the tile buffer is a first-in first-out buffer.

6. The video processing device of claim 1, wherein each of the input video streams has tile definitions associated with it, which are the same for each image of the respective input video stream and which define the shape and position of each tile of the respective image.

7. The video processing device of claim 1, wherein the input tiles in the set of input tiles are band-shaped.

8. The video processing device of claim 1, connected or connectable to two or more video sources so as to receive each of said video streams from a respective one of the video sources.

9. The video processing device of claim 1, wherein each output image of the output video stream represents a panoramic view, a surround view, or a bird's eye view.

10. The video processing device of claim 1, located on a single chip.

11. A method of generating an output video stream on the basis of two or more concurrent input video streams, wherein each of the input video streams comprises a sequence of input images, the output video stream comprises a sequence of output images, and the method comprises, for each of said output images:

generating the output image by merging a set of input images, wherein the set of input images comprises one input image from each of said input video streams and wherein said operation of merging the set of input images comprises a series of two or more merging rounds, wherein each round comprises:

forming an output tile by merging a set of input tiles, wherein the set of input tiles comprises one input tile from each input image of said set of input images, wherein merging the set of input tiles comprises:

providing at least a part of input tile data in a tile buffer, the input tile data representing the set of input tiles; and operating a processing unit to retrieve the at least part of the input tile data from the tile buffer and to compute the output tile on the basis of the retrieved input tile data, comprising:

stopping computing the output tile in response to detecting that required input tile data is not present in the tile buffer and resuming computing the output tile in response to retrieving the required input tile data from the tile buffer.

* * * * *